United States Patent
Oostveen et al.

(10) Patent No.: US 7,478,242 B2
(45) Date of Patent: Jan. 13, 2009

(54) INCREASING INTEGRITY OF WATERMARKS USING ROBUST FEATURES

(75) Inventors: Job Cornelis Oostveen, Eindhoven (NL); Antonius Adrianus Cornelis Maria Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 755 days.

(21) Appl. No.: 10/498,965

(22) PCT Filed: Dec. 9, 2002

(86) PCT No.: PCT/IB02/05251

§ 371 (c)(1),
(2), (4) Date: Jun. 16, 2004

(87) PCT Pub. No.: WO03/055222

PCT Pub. Date: Jul. 3, 2003

(65) Prior Publication Data
US 2005/0120220 A1    Jun. 2, 2005

(30) Foreign Application Priority Data
Dec. 21, 2001    (EP) ................................. 01205141

(51) Int. Cl.
*G06K 9/00* (2006.01)
(52) U.S. Cl. ........................................ 713/176; 382/100
(58) Field of Classification Search ................. 382/264, 382/100
See application file for complete search history.

(56) References Cited

U.S. PATENT DOCUMENTS

| | | | | |
|---|---|---|---|---|
| 5,606,609 A | * | 2/1997 | Houser et al. ............... | 713/179 |
| 5,822,432 A | * | 10/1998 | Moskowitz et al. ........... | 380/28 |
| 6,522,767 B1 | * | 2/2003 | Moskowitz et al. ......... | 382/100 |
| 6,532,541 B1 | * | 3/2003 | Chang et al. ................ | 713/176 |
| 6,785,815 B1 | * | 8/2004 | Serret-Avila et al. ........ | 713/176 |
| 7,007,166 B1 | * | 2/2006 | Moskowitz et al. ......... | 713/176 |
| 7,143,290 B1 | * | 11/2006 | Ginter et al. ................ | 713/176 |
| 7,159,116 B2 | * | 1/2007 | Moskowitz .................. | 713/176 |
| 7,209,571 B2 | * | 4/2007 | Davis et al. ................. | 382/100 |
| 2001/0034835 A1 | * | 10/2001 | Smith ......................... | 713/175 |
| 2002/0001395 A1 | * | 1/2002 | Davis et al. ................. | 382/100 |
| 2002/0009208 A1 | * | 1/2002 | Alattar et al. ............... | 382/100 |
| 2002/0010684 A1 | * | 1/2002 | Moskowitz .................. | 705/75 |
| 2002/0042884 A1 | * | 4/2002 | Wu et al. .................... | 713/201 |
| 2002/0090110 A1 | * | 7/2002 | Braudaway et al. ......... | 382/100 |
| 2002/0106103 A1 | * | 8/2002 | Jones et al. ................. | 382/100 |
| 2002/0157005 A1 | * | 10/2002 | Brunk et al. ................ | 713/176 |
| 2003/0012374 A1 | * | 1/2003 | Wu et al. .................... | 380/44 |
| 2003/0012548 A1 | * | 1/2003 | Levy et al. .................. | 386/46 |
| 2003/0031318 A1 | * | 2/2003 | Troyansky et al. .......... | 380/202 |
| 2003/0056103 A1 | * | 3/2003 | Levy et al. .................. | 713/176 |
| 2003/0208679 A1 | * | 11/2003 | Lopez Vazquez ........... | 713/176 |
| 2004/0022444 A1 | * | 2/2004 | Rhoads ....................... | 382/232 |

(Continued)

*Primary Examiner*—Matthew B Smithers
(74) *Attorney, Agent, or Firm*—Larry Liberchuk

(57) ABSTRACT

This invention relates to a method of embedding a watermark pattern with a payload in a time dependent information signal, comprising the steps of determining a number of robust signatures in the information signal, creating the payload being dependent of at least one of the number of robust signatures and a predefined message, embedding the watermark pattern according to the payload in the information signal. The invention also relates to a corresponding method and arrangement for detecting a watermark pattern in an information signal.

20 Claims, 1 Drawing Sheet

U.S. PATENT DOCUMENTS

2004/0250070 A1* 12/2004 Wong .................. 713/170
2005/0091338 A1* 4/2005 de la Huerga .......... 709/217
2005/0251683 A1* 11/2005 Levy et al. ............ 713/176
2007/0101147 A1* 5/2007 Brunk et al. ........... 713/176
2007/0110272 A1* 5/2007 Sharma et al. .......... 382/100

* cited by examiner

INCREASING INTEGRITY OF WATERMARKS USING ROBUST FEATURES

The invention relates to a method and an arrangement for embedding auxiliary data, such as a watermark in an information signal, e.g. a video signal, an audio signal, or more generally, multimedia content. The invention also relates to a method and arrangement for detecting said watermark pattern and a device for recording and/or playing back an information signal.

The auxiliary data may e.g. be a digital watermark, which preferably (but not necessarily) is an imperceptible label that is embedded/added to an information/host signal e.g. comprising multimedia content, video, audio, etc. The label may contain for instance copyright information, the name of the owner of the material, rights for a user etc. The information that may be stored in or derived on the basis of a watermark is usually referred to as a payload and is expressed in bits. Note, that sometimes the term 'payload' of embedded watermarks also refers to the amount of information that may be stored in or derived on the basis of an embedded watermark. However, throughout the following the term 'payload' refers to actual values (e.g. a bit-string) that are transferred, embedded, derived, etc. on the basis of a watermark.

In most watermark schemes the watermark is a pseudo-random noise sequence (pn-sequence), which is added to a host signal/information signal in either the time, spatial or a transformed domain (e.g. Fourier, Discrete Cosine or Wavelet Domain). Watermark detection is then usually based on a correlation between the watermark and the embedded host signal. In this case we have a 1 bit payload for the watermark, i.e. the noise sequence is either present or it is not present.

A recognized problem in the security of watermarking is the so-called copy attack. This attack estimates a watermark from an embedded host signal and subsequently the estimated watermark can be transplanted in a second signal. If the second signal was originally unmarked then a signal is generated which in terms of watermarking assumes identity of the embedded host signal. Further if the second signal was already marked with a watermark then the newly created signal might confuse watermark detectors.

In order to avoid the copy-attack one option is to make the watermark dependent on the content of the host signal. This is done by extracting a robust signature (a set of robust features) from the content of the host signal and make the watermark dependent on this signature, e.g. as disclosed in patent application WO 01/39121. A robust signature is a set of variables that is representative of the essentials of the host signal. If e.g. the host signal is a video signal, then ideally a slight change in the image represented by the video signal leads to no change in the signature, whereas a complete different image results in a radically different signature.

The above method leads to detection problems when the signature changes very quickly such as a "flashy" video clip. In known watermarking systems, the watermark is embedded in frames of the host signal. When detecting the watermark in the host signal, all the frames in a time period of e.g. 2 seconds are accumulated in a buffer. Thereby the watermarks in each frame add up coherently, improving the signal to noise ratio for the watermark detection. After the accumulation step the buffer is correlated with the watermark pattern, and the result is compared to a threshold. A problem with the above-described idea is when a watermark is detected in e.g. ten seconds of video material, the signature might have changed four times in this period. In this case, the watermark pattern also changes four times in the detection period, and hence the watermarks do not add up coherently. This leads to a lesser improvement in detection signal to noise ratio.

It is an object of the invention to provide a method and arrangement for embedding additional/auxiliary data in an information signal where the method and arrangement solves the above-mentioned problems.

This is achieved by a method (and corresponding arrangement) of embedding a watermark pattern with a payload in a time dependent information signal, comprising the steps of:
  determining a number of robust signatures, each signature being a set of robust features in the information signal, the robust signatures being determined in a predetermined time interval of said information signal,
  creating the payload being dependent of at least one of said number of robust signatures and a predefined message,
  embedding the watermark pattern according to the payload in the information signal.

The corresponding method (and corresponding arrangement) of detecting auxiliary data in an information signal comprises the steps of detecting a message in a time dependent information signal with an embedded watermark pattern, comprising the steps of:
  detecting the watermark pattern in the information signal and detecting the payload,
  determining a number of robust signatures, each signature being a set of robust features in the information signal, the robust signatures being determined in a predetermined time interval of the information signal,
  decoding the message from the payload using at least one of the number of robust signatures.

Preferred embodiments of the invention are defined in the sub claims.

Hereby, the information in the payload of the watermark depends on the information signal and the message can only be detected in combination with information from the information signal. Thereby it is not possible to copy the watermark and use it on another information signal with different information/content.

For the sake of convenience the invention will be described as a system for embedding/attaching labels, preferably invisible to the human eye, to video content but the teachings can obviously be applied to any other contents including audio and multimedia. Additionally, an embodiment for detecting labels is also described.

Figure 1:
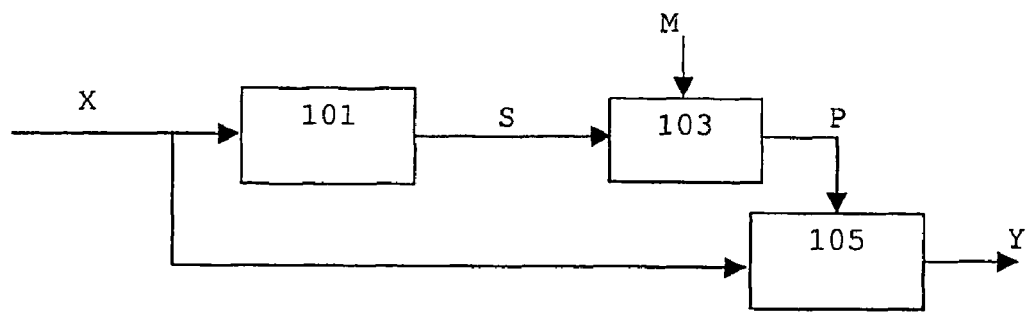
FIG. 1 shows an embodiment of an embedding arrangement according to the present invention.

FIG. 1 shows an embodiment of an embedding arrangement according to the present invention. A source provides an information signal X to be embedded with auxiliary information/a watermark. The source may e.g. provide an image, an audio signal, a signal with multimedia content, etc. As an example used in the following, the information signal X is time dependent. Also shown is watermark embedding means (105), which adds a watermark W to the information signal X.

The watermark W is generated by first extracting a number of robust signatures from the information signal X in a predetermined time interval, each robust signature is a set of robust features extracted from the content of the information signal X. The extraction is performed using signature extraction means (101) and the output of the signature extraction means (101) is a signature S.

The signature S is used as input to the payload generating means (103) together with a message M. The payload generating means (103) determine a payload P as a signature dependent, invertible function $f_s(\bullet)$ of the message M.

$$P=f_s(M)$$

The payload P and thereby watermark pattern W is embedded in the information signal P by the watermark embedding means (105) and an information signal (Y) is generated comprising the watermark pattern W.

In a specific embodiment the payload P is generated by concatenating the message M and a function $g(\bullet)$ of the signature S, e.g.

$$P=(M,g(S))=(P1,P2)$$

As mentioned above, a number of signatures are extracted from the information signal and examples of different methods of determining which signature(s) to use during payload encoding will be described in the following.

The signature could be chosen randomly, this would require memory means in order to use the same signature when the payload is to be decoded during watermark detection.

The signature could also be chosen between the number of signatures as the n-th signature, e.g. the 5.th signature extracted from the information signal.

Alternatively, the signature could be chosen as the signature found after a predetermined number of seconds (in the interval of T seconds during which the payload is kept constant).

As another alternative, it may be the most robust signature that is chosen, whereby the probability of failure during decoding would decrease. The most robust signature could be chosen using a predefined robustness measure.

Further the signature to be used could be chosen using a key-frame.

Figure 2:
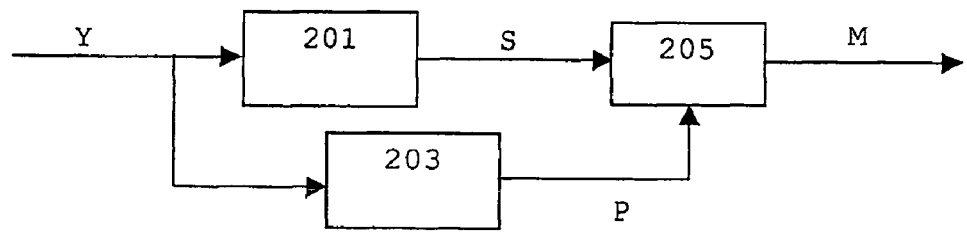
FIG. 2 illustrates a schematic diagram of a detector according to the present invention.

FIG. 2 illustrates a schematic diagram of a detector according to the present invention. Shown is an information/host signal Y, which as an example is time dependent and possible contains a watermark with a message M to be detected.

First a number of robust signatures are extracted from the information signal X in a predetermined time interval, each robust signature is a set of robust features extracted from the content of the information signal X. The extraction is performed using signature extraction means (201) and the output of the signature extraction means (201) is a signature S.

Further the payload P is extracted from the information signal Y using a watermark detection means (203).

The signature is used to generate an inverse signature dependent function $f_s^{-1}$ and the message M is decoded from the payload P using the payload P as input to the inverse signature dependent function $f_s^{-1}(\bullet)$, $$M=f_s^{-1}(P)$$

The decoding is performed by payload decoding means (205), which have the signature S and the payload P as input and the message M as output.

The signature can be chosen according to the same methods as described earlier in connection with the embedding process. When choosing the signature it is important that the signature used during the embedding process is also used during detection.

Figure 3:
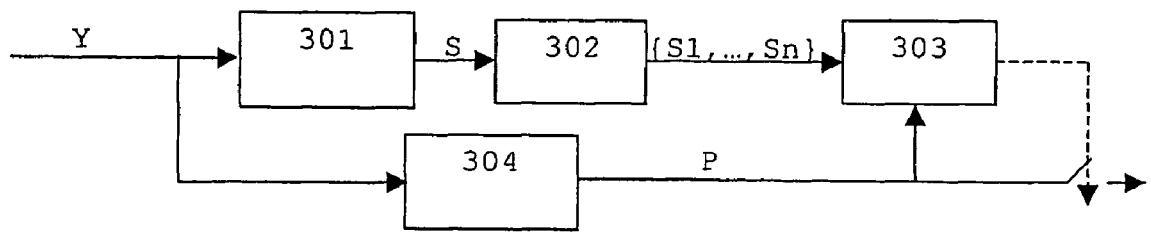
FIG. 3 illustrates a detailed embodiment of a detector according to the present invention.

A more detailed embodiment of the watermark detector is shown in FIG. 3. The signatures are extracted from the information signal Y by the signature extraction means (301). Then all the collected signatures {S1, . . . , Sn} from a predefined time interval are collected by signature collection means (302). Means for checking the integrity (303) then combines the signatures {S1, . . . , Sn} with a payload extracted from the information signal using a watermark detector (304). Information about the integrity can then be used for controlling access restrictions to the information signal.

Figure 4:
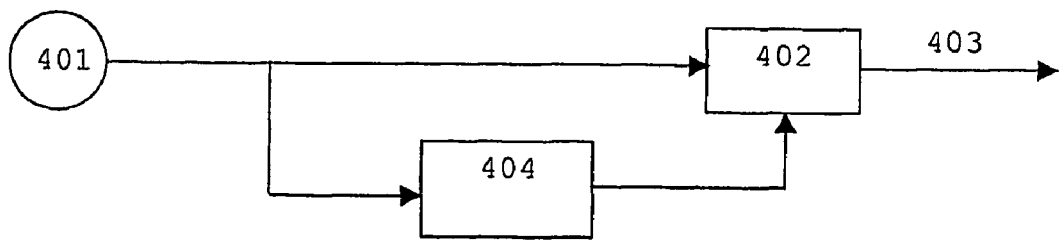
FIG. 4 shows a device for recording and/or playing back an information multi-media bit stream with an embedded watermark.

The embedded information may identify, for example, the copyright holder, a description of the content and/or rights associated with the use of the content. In DVD copy protection it would allow material to be labelled as 'copy once', 'never copy', 'copy no more', etc. FIG. 4 shows a device, e.g. a DVD player, for recording and/or playing back an MPEG encoded bit stream with an embedded watermark. The bit stream is recorded/stored on an information medium like a DVD disc 401. The recorded signal is applied to an output terminal 403 via a switch 402. The output terminal 403 is connected to an external MPEG decoder and display device (not shown). It is assumed that the DVD player may not play back video signals with a predetermined embedded watermark, unless other conditions are fulfilled which are not relevant to the present invention. For example, watermarked signals may only be played back if the medium 401 includes a so-called "wobble" key. In order to detect the watermark, the DVD player comprises a watermark detector 404 as described above. The detector receives the recorded signal and controls the switch 403 in response to whether or not the watermark is detected and/or what the value of the auxiliary data/the message signifies.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of embedding a watermark pattern (W) with a payload (P) in a time dependent information signal (X), comprising the steps of:
    determining a number of robust signatures (S), each signature (S) being a set of robust features in said information signal (X), said robust signatures being determined in a predetermined time interval of said information signal,
    creating the payload (P) being dependent of at least one of said number of robust signatures (S) and a predefined message (M),
    embedding said watermark pattern (W) according to said payload (P) in said information signal (X).

2. A method according to claim 1 wherein the payload (P) is created as a signature dependent, invertible function of said message (M).

3. A method according to claim 1 wherein the payload (P) is created by concatenating the message (M) and a function of at least one of said signatures (S).

4. A method according to claim 1, wherein the payload is dependent of at least one random signature from said number of robust signatures (S).

5. A method according to claim 1, wherein the payload is dependent of at least the n-th signature from said number of robust signatures (S).

6. A method according to claim 1, wherein the payload is dependent of at least the most robust signature from said number of robust signatures (S).

7. A method according to claim 1, wherein the payload is dependent of signature chosen from said number of robust signatures (S), the signature being chosen using a key-frame.

8. A method of detecting a message (M) in a time dependent information signal (Y) with an embedded watermark pattern (W), said method comprising the steps of:

detecting the watermark pattern (W) in said information signal (Y) and detecting the payload (P), determining a number of robust signatures, each signature (S) being a set of robust features in said information signal (Y), said robust signatures being determined in a predetermined time interval of said information signal (Y), decoding said message (M) from said payload (P) using at least one of said number of robust signatures.

9. A method according to claim 8 wherein the message (M) is decoded from the payload (P) using a signature dependent, invertible function of said payload (P).

10. A method according to claim 8 wherein payload (P) has been created by concatenating the message (M) and a function of at least one of said signatures (S) and wherein the step of decoding the payload (P) comprises means for selecting the relevant part of said payload (P).

11. A method according to claim 10 wherein the decoding of said message from said payload comprises the step of checking that the remaining part of the payload is a function of at least one of said signatures (S).

12. A method according to any of the claim 8, wherein the decoding of said message (M) from said payload (P) is done using the n-th signature from said number of robust signatures (S).

13. A method according to any of the claim 8, wherein the decoding of said message (M) from said payload (P) is done using the most robust signature from said number of robust signatures (S).

14. A method according to any of the claim 8, wherein the decoding of said message (M) from said payload (P) is done by consecutively using all the signatures from said number of robust signatures (S).

15. An arrangement for embedding a watermark pattern (W) with a payload (P) in a time dependent information signal (X), comprising:

means for determining a number of robust signatures (S), each signature (S) being a set of robust features in said information signal (X), said robust signatures being determined in a predetermined time interval of said information signal, means for creating the payload (P) being dependent of at least one of said number of robust signatures (S) and a predefined message (M), means for embedding said watermark pattern (W) according to said payload (P) in said information signal (X).

16. An arrangement for detecting a message (M) in a time dependent information signal (Y) with an embedded watermark pattern (W), comprising:

means for detecting the watermark pattern (W) in said information signal (Y) and detecting the payload (P), means for determining a number of robust signatures, each signature (S) being a set of robust features in said information signal (Y), said robust signatures being determined in a predetermined time interval of said information signal (Y), means for decoding said message (M) from said payload (P) using at least one of said number of robust signatures.

17. A device for recording and/or playing back an information signal, the device comprising means (402) for disabling recording and/or playback of the information signal in dependence upon a watermark pattern (W) embedded in said information signal wherein the device further comprises an arrangement (404) for detecting said basic watermark pattern (V) according to claim 16.

18. A device for transmitting an information signal, the device comprising an arrangement for embedding a watermark pattern (W) with a payload (P) in a time dependent information signal (X), comprising:

means for determining a number of robust signatures (S), each signature (S) being a set of robust features in said information signal (X), said robust signatures being determined in a predetermined time interval of said information signal, means for creating the payload (P) being dependent of at least one of said number of robust signatures (S) and a predefined message (M), means for embedding said watermark pattern (W) according to said payload (P) in said information signal (X).

19. A computer readable medium including information signal (Y) with an embedded watermark pattern (W) and a payload (P), said payload (P) being dependent of at least one of a number of robust signatures in said information signal (Y) and a predefined message (M).

20. The computer readable medium including information signal (P) according to claim 19, wherein the payload (P) is a signature dependent, invertible function of said message (M).

* * * * *